(12) United States Patent
Shih et al.

(10) Patent No.: US 11,483,530 B1
(45) Date of Patent: Oct. 25, 2022

(54) COLOR COMPENSATION METHOD AND SYSTEM

(71) Applicant: NOVATEK Microelectronics Corp., Hsin-Chu (TW)

(72) Inventors: En-Shi Shih, Hsinchu (TW); Yen-Tao Liao, Hsinchu (TW); Shih-Ting Huang, Hsinchu County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 17/694,650

(22) Filed: Mar. 14, 2022

(30) Foreign Application Priority Data

Nov. 4, 2021 (TW) .................................. 110141051

(51) Int. Cl.
*H04N 9/69* (2006.01)
*H04N 9/04* (2006.01)

(52) U.S. Cl.
CPC ............ *H04N 9/69* (2013.01); *H04N 9/04515* (2018.08)

(58) Field of Classification Search
CPC ......... H04N 5/57; H04N 9/69; H04N 9/04515
USPC ................................. 348/674, 673, 675, 687
See application file for complete search history.

(56) References Cited

U.S. PATENT DOCUMENTS

| 7,916,153 | B1 * | 3/2011 | Lew ..................... G09G 3/3406 348/687 |
| 2006/0176407 | A1 * | 8/2006 | Ikeda ..................... H04N 5/202 348/674 |
| 2018/0182298 | A1 | 6/2018 | Jang | |

FOREIGN PATENT DOCUMENTS

TW 200945317 11/2009

* cited by examiner

*Primary Examiner* — Sherrie Hsia
(74) *Attorney, Agent, or Firm* — Winston Hsu

(57) ABSTRACT

A color compensation method includes obtaining a target brightness, a target frame rate and a target pulse number; selecting a plurality of second gamma groups from a plurality of first gamma groups according to the target brightness and the target pulse number, wherein the plurality of first gamma groups respectively correspond to a plurality of frame rates; and calculating the compensation value to compensate the display brightness and color according to the target brightness, the target frame rate, the plurality of second gamma groups and a calculation method.

12 Claims, 4 Drawing Sheets

COLOR COMPENSATION METHOD AND SYSTEM

BACKGROUND OF THE INVENTION

1. Field of the Invention

The present invention relates to a color compensation method and color compensation system, and more particularly, to a color compensation method and color compensation system capable of calibrating the display color when a monitor operates at different frame rates and different pulse numbers.

2. Description of the Prior Art

An Organic Light-Emitting Diode (OLED) monitor has the advantages of colorfulness, thin and light volume, and obvious power saving effect, so it has become popular. However, under different frame rates of the OLED monitor, the emission duty cycle used to control the brightness is changed due to the variation of the vertical blanking interval (VBI), which causes brightness diversity. The brightness diversity may make the user perceive the phenomenon of flicker. To mitigate flickers, the prior art may adjust digital gamma or programmable gamma (P-gamma) to compensate the color information.

In addition, the OLED monitor is prone to burn-in due to life limitation of the organic materials. Therefore, the pulse width modulation (PWM) is used to generate a signal with multiple pulses to prevent the monitor from lighting up for a long time. However, when the pulse number is too large, it will cause difficulty in high-brightness light emission. Therefore, pulse width modulation with different pulse numbers is required to control the brightness in practical applications. When switching the pulse width modulation with different pulse numbers, the unevenness between the transistors in the display panel would cause different time lengths for the transistors to charge and discharge, and also cause different display brightness. Thus, how to calibrate the display color of the OLED monitor for different frame rates and different pulse numbers has become one of the issues in the industry.

SUMMARY OF THE INVENTION

The present invention provides a color compensation method and a color compensation system to calibrate the display color when the monitor is operating at different frame rates and different pulse numbers.

The present invention provides a color compensation method for a monitor, which comprises obtaining a target brightness, a target pulse number and a target frame rate; selecting a plurality of second gamma groups from a plurality of first gamma groups according to the target pulse number, wherein the plurality of first gamma groups respectively correspond to a plurality of frame rates; and calculating a compensation value for compensating a brightness and a color of the monitor according to the target brightness, the target frame rate, the plurality of second gamma groups and a calculation method.

The present invention provides a color compensation system for a monitor, which comprises an input device, for inputting a target brightness, a target pulse number and a target frame rate; a timing controller, coupled to the input device; and a memory, coupled to the timing controller, storing a program code for instructing the timing controller to execute a color compensation method, wherein the color compensation method comprises selecting a plurality of second gamma groups from a plurality of first gamma groups according to the target pulse number, wherein the plurality of first gamma groups respectively correspond to a plurality of frame rates; and calculating a compensation value for compensating a brightness and a color of the monitor according to the target brightness, the target frame rate, the plurality of second gamma groups and a calculation method.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figure 1:
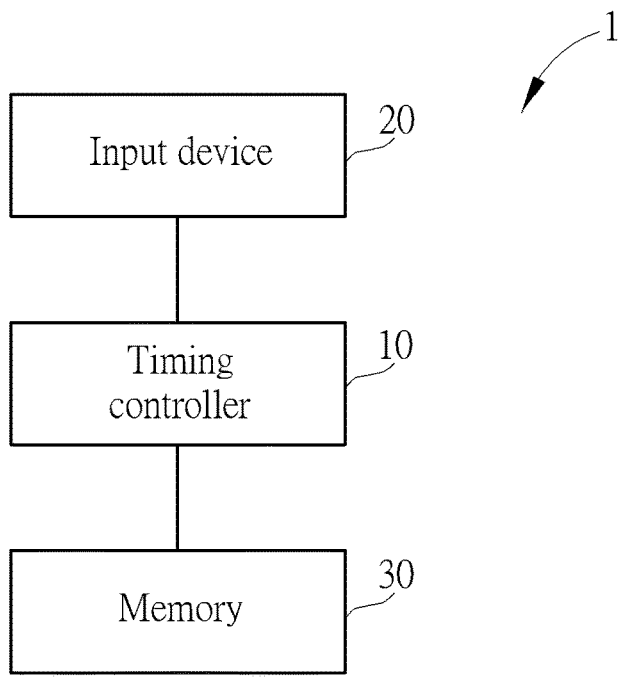
FIG. 1 is a schematic diagram illustrating a color compensation system according to an embodiment of the present invention.

Please refer to FIG. 1. FIG. 1 is a schematic diagram illustrating a color compensation system 1 according to an embodiment of the present invention. The color compensation system 1 includes a timing controller 10, an input device 20 and a memory 30. The timing controller 10 is coupled to the input device 20 and the memory 30. The memory 30 stores a program code to instruct the timing controller 10 to execute a color compensation method. It should be noted that the color compensation system 1 only represents the necessary components required to execute the color compensation method, the basic structure is well known in the art, and will not be repeated.

Figure 2:
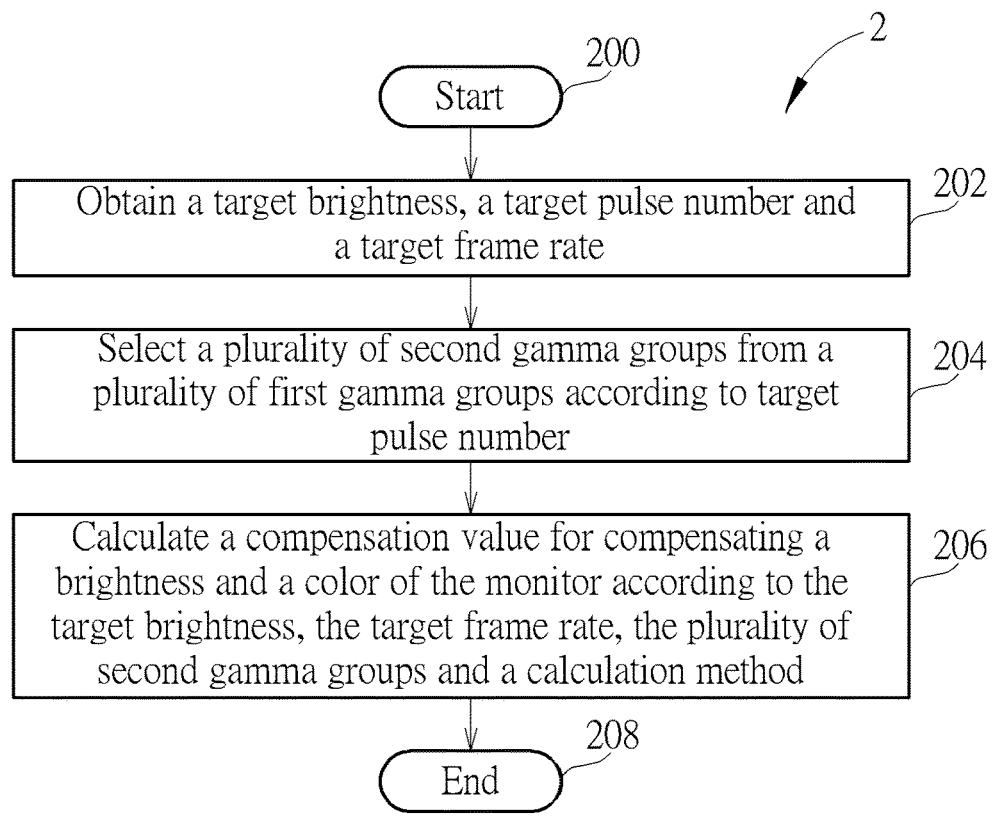
FIG. 2 is a flowchart of a color compensation method according to an embodiment of the present invention.

The color compensation method for the color compensation system 1 may be summarized as a process 2. As shown in FIG. 2, the process 2 includes the following steps:

Step S200: Start.

Step S202: Obtain a target brightness, a target pulse number and a target frame rate.

Step S204: Select a plurality of second gamma groups from a plurality of first gamma groups according to target pulse number.

Step S206: Calculate a compensation value for compensating a brightness and a color of the monitor according to the target brightness, the target frame rate, the plurality of second gamma groups and a calculation method.

Step S208: End.

According to the process 2, in Step S202, the user may input the target brightness of the monitor, the target pulse number of the pulse width modulation to achieve the target brightness and the target frame rate through the input device 20. However, the manner in which the timing controller 10 obtains the target brightness, the target pulse number and the target frame rate is not limited thereto. For example, the timing controller 10 may obtain different target brightness, target pulse numbers and target frame rates from the memory 30 or based on the requirements of different applications.

Figure 3:
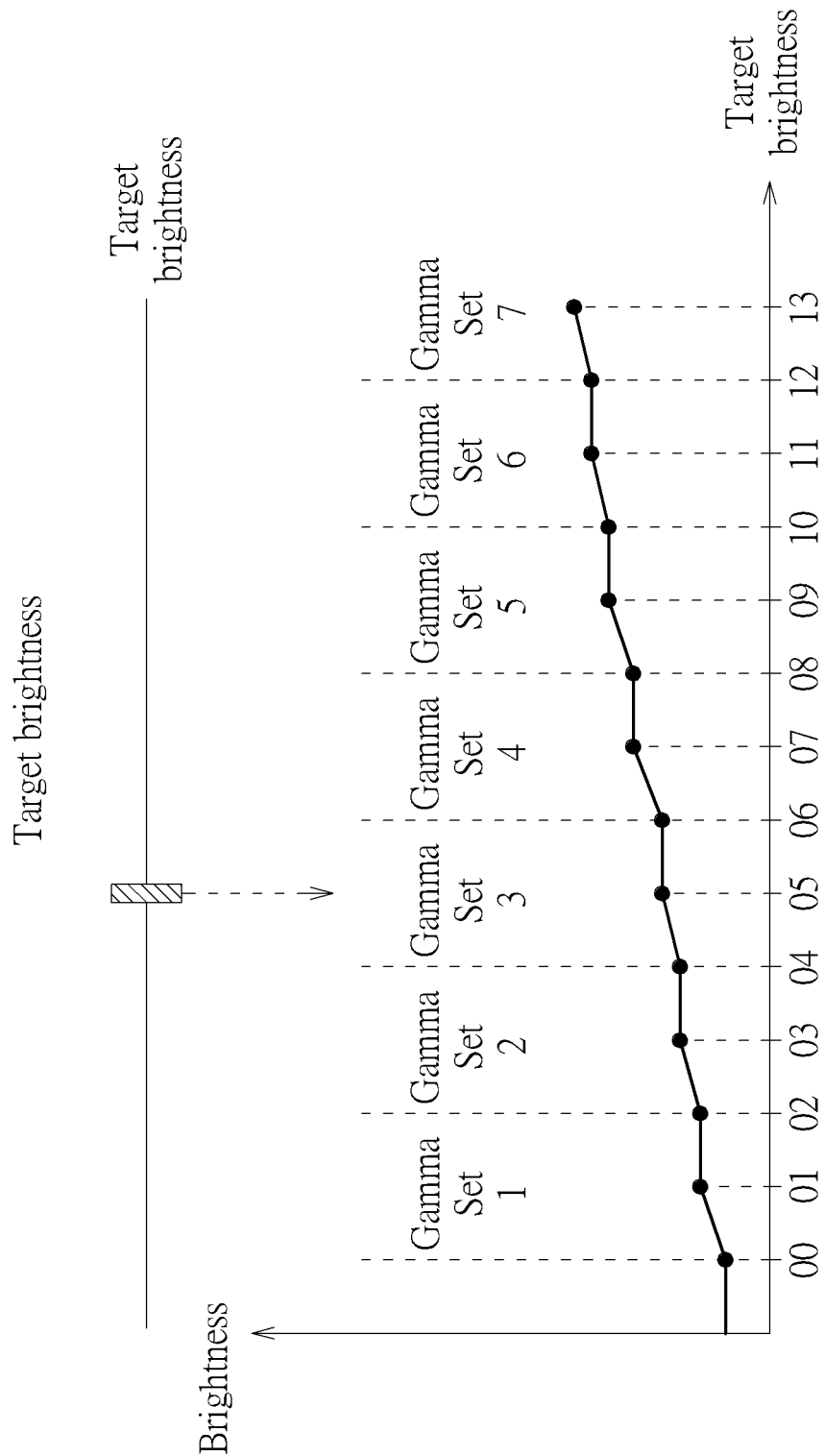
FIG. 3 is a schematic diagram illustrating the relationship between the target brightness and plurality of gamma sets according to an embodiment of the present invention.

For illustrating step S204, please also refer to FIG. 3. FIG. 3 is a schematic diagram illustrating the relationship between the target brightness and a plurality of gamma sets according to an embodiment of the present invention. The timing controller 10 may select a plurality of second number transformations from a plurality of first pulse number transformations according to the requirement of the practical applications, and each of the plurality of second number transformations includes a plurality of second gamma groups. The timing controller 10 may obtain the target brightness from a front-end system, and obtain the corresponding gamma set of the plurality of gamma sets stored in the memory 30 according to the target brightness, wherein each gamma set includes the plurality of first pulse number transformations, and each first pulse number transformation further includes a plurality of first gamma groups.

Figure 4:
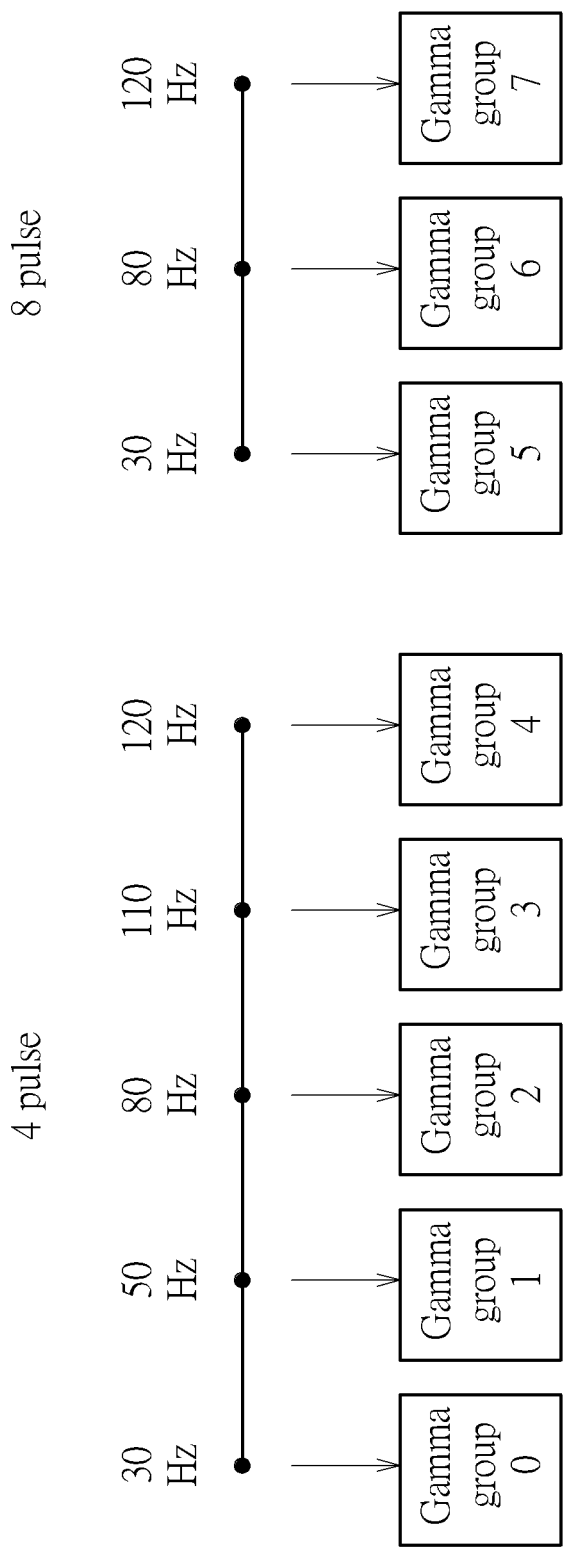
FIG. 4 is a schematic diagram of the plurality of gamma groups corresponding to different pulse numbers according to an embodiment of the present invention.

For example, in an embodiment, please refer to FIG. 3 and FIG. 4. The user may select the target brightness equal to 05 through a brightness adjustment interface, and obtain the Gamma Set 3 stored in the memory 30. Gamma Set 3 includes 5 pulse number transformations respectively corresponding to 2, 4, 5, 8 and 10 pulse numbers in a refresh cycle. Each pulse number transformation further contains the gamma groups respectively corresponding to 30 Hz, 40 Hz, 50 Hz, 60 Hz, 70 Hz, 80 Hz, 90 Hz, 100 Hz, 110 Hz and 120 Hz, wherein an application frequency range is 30 Hz-120 Hz. In the practical application of OLED monitors, the pulse width modulation may be used to generate signals with different pulse numbers to control the brightness. For example, when the target brightness equals 05, the timing controller 10 may select 2 pulse number transformations corresponding to 4 and 8 pulse numbers according to the practical application, and make the pulse number transformation with 4 pulse numbers include the Gamma Group 0-4 respectively corresponding to 30 Hz, 50 Hz, 80 Hz, 110 Hz and 120 Hz, and the pulse number transformation with 8 pulse numbers include the Gamma Group 5-7 respectively corresponding to 30 Hz, 80 Hz and 120 Hz.

Moreover, in step S206, the timing controller 10 may calculate the compensation value to compensate the brightness of the monitor according to the target brightness, the target frame rate, the plurality of second gamma groups included in the plurality of second pulse number transformations and the calculation method. In an embodiment, the target frame rate may be arbitrarily changed within the application frequency range of the plurality of frame rates. For example, the target frame rate may be selected to be 50 Hz and 80 Hz with gamma group stored in the memory 30, or any frequency such as 57 Hz and 88 Hz between the application frequency range 30 Hz to 120 Hz. In another embodiment, when the target frame rate is 57 Hz, the target brightness equals 05 and the target pulse number equals 4, the timing controller 10 may select the Gamma Group 1 corresponding to 50 Hz and the Gamma Group 2 corresponding to 80 Hz, and calculate the compensation value to compensate the brightness and the color of the monitor according to the calculation method. For example, as shown in the following equation (1), the timing controller 10 calculates the compensation value $G_{out}$ to compensate the brightness and the color of the monitor according to an interpolation algorithm.

$$G_A = G_{A1} + (G_{A2} - G_{A1}) \times (d - d_1)/(d_2 - d_1) \quad (1)$$

$$G_B = G_{B1} + (G_{B2} - G_{B1}) \times (d - d_1)/(d_2 - d_1)$$

$$G_{out} = G_A + (G_B - G_A) \times (f - f_1)/(f_2 - f_1)$$

where f is the target frame rate, $f_1$ and $f_2$ are the frame rates close to the target frame rate, $G_{A1}$ and $G_{B1}$ are the gamma groups corresponding to $f_1$, $G_{A2}$ and $G_{B2}$ are the gamma groups corresponding to $f_2$, and $G_{out}$ is the compensation value when the target frame rate is f.

Figure 5:
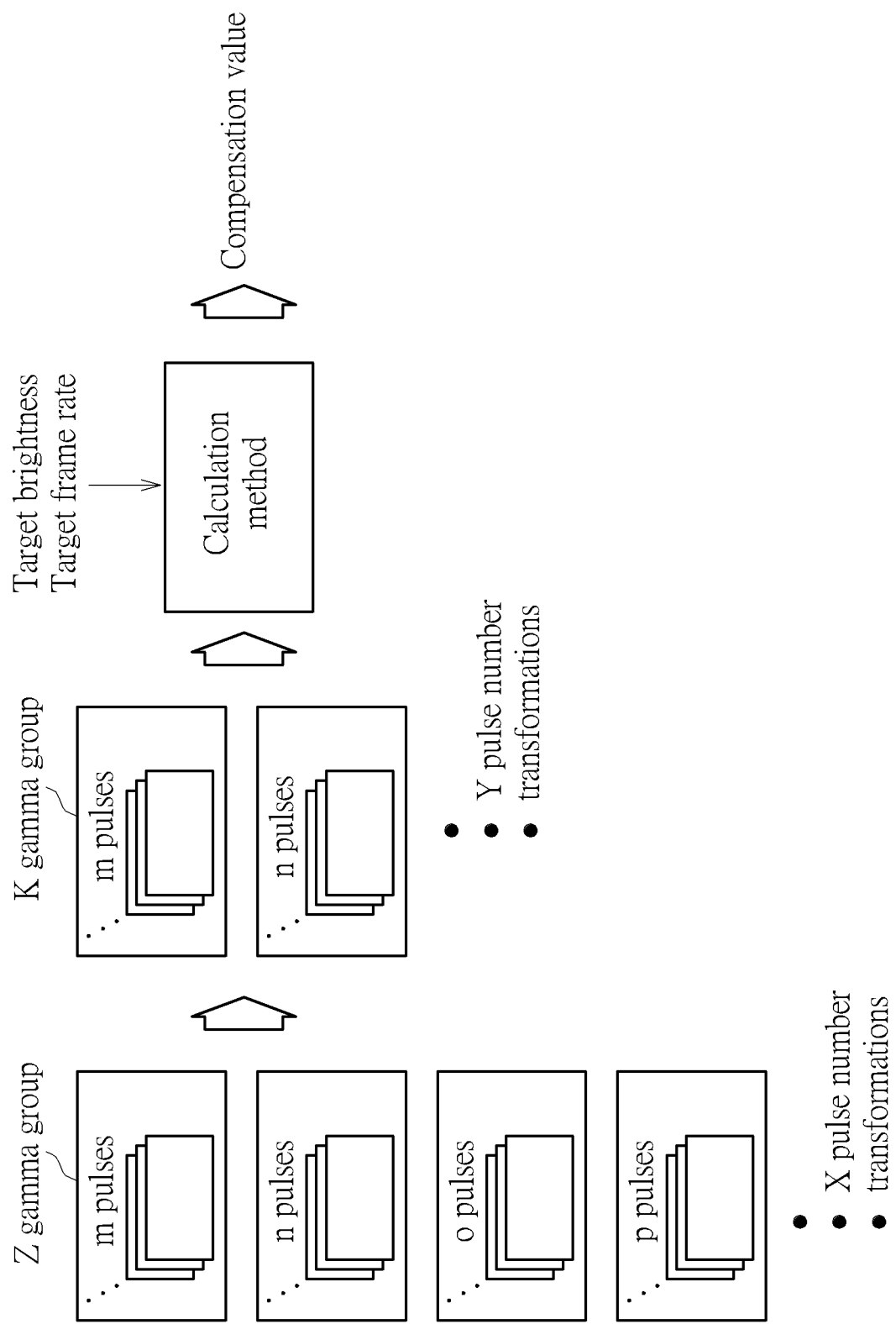
FIG. 5 is a schematic diagram illustrating a color compensation method according to an embodiment of the present invention.

Moreover, in an embodiment, please refer to FIG. 5. The memory stores Z gamma groups corresponding to X pulse number transformations. The timing controller 10 selects K gamma groups corresponding to Y pulse number transformations according to the target brightness, the target pulse number and the target frame rate, wherein the gamma groups corresponding to Y pulse number transformations may be the same or different amounts. The timing controller 10 calculates the compensation value to compensate the brightness and the color of the monitor according to K gamma groups corresponding to Y pulse number transformations, the target brightness and the calculation method.

It should be noted that the color compensation system 1 is an embodiment of the present invention. Those skilled in the art may readily make combinations, modifications and/or alterations to the abovementioned description and examples. The abovementioned description, steps, processes, procedures and/or processes including suggested steps may be realized by means that could be hardware, software, firmware (known as a combination of a hardware device and computer instructions and data that reside as read-only software on the hardware device), an electronic system, or combination thereof. Examples of hardware may include analog, digital and mixed circuits known as microcircuit, microchip, or silicon chip. Examples of the electronic system may include a system on chip (SoC), system in package (SiP), a computer on module (CoM) and the color compensation system 1. Any of the abovementioned processes, procedures and examples above may be compiled into program codes or instructions that are stored in the memory 30. The memory 30 may include read-only memory (ROM), flash memory, random access memory (RAM), subscriber identity module (SIM), hard disk, floppy diskette, or CD-ROM/DVD-ROM/BD-ROM, but not limited thereto. The timing controller 10 may read and execute the program codes or the instructions stored in the memory 30 for realizing the abovementioned functions.

In summary, compared to the prior art where the digital gamma value may only be adjusted for the fixed frame rates to compensate the brightness and the color of the monitor, the present invention may calibrate the brightness and the color of OLED monitor for any frame rates and different pulse numbers in the application frequency range.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A color compensation method for a monitor, comprising:
   obtaining a target brightness, a target pulse number and a target frame rate;
   selecting a plurality of second gamma groups from a plurality of first gamma groups according to the target pulse number, wherein the plurality of first gamma groups respectively correspond to a plurality of frame rates; and
   calculating a compensation value for compensating a brightness and a color of the monitor according to the target brightness, the target frame rate, the plurality of second gamma groups and a calculation method.

2. The color compensation method of claim 1, wherein the step of selecting the plurality of second gamma groups from the plurality of first gamma groups according to the target pulse number, further comprises:
   selecting a plurality of second pulse number transformations from a plurality of first pulse number transformations according to the target brightness, wherein each of the plurality of first pulse number transformations comprises the plurality of first gamma groups and each of the plurality of second pulse number transformations comprises the plurality of second gamma groups of the plurality of first gamma groups.

3. The color compensation method of claim 2, wherein the plurality of second pulse number transformations respectively correspond to the same or different amounts of the plurality of second gamma groups.

4. The color compensation method of claim 1, wherein the plurality of frame rates are within an application frequency range.

5. The color compensation method of claim 4, wherein the target frame rate is within a range of the plurality of frame rates.

6. The color compensation method of claim 1, wherein the calculation method is an interpolation algorithm.

7. A color compensation system for a monitor, comprising:
   an input device, for inputting a target brightness, a target pulse number and a target frame rate;
   a timing controller, coupled to the input device; and
   a memory, coupled to the timing controller, storing a program code for instructing the timing controller to execute a color compensation method, wherein the color compensation method comprises:
      selecting a plurality of second gamma groups from a plurality of first gamma groups according to the target pulse number, wherein the plurality of first gamma groups respectively correspond to a plurality of frame rates; and
      calculating a compensation value for compensating a brightness and a color of the monitor according to the target brightness, the target frame rate, the plurality of second gamma groups and a calculation method.

8. The color compensation system of claim 7, wherein the step of selecting the plurality of second gamma groups from the plurality of first gamma groups according to the target pulse number, further comprises:
   selecting a plurality of second pulse number transformations from a plurality of first pulse number transformations according to the target brightness, wherein each of the plurality of first pulse number transformations comprises the plurality of first gamma groups and each of the plurality of second pulse number transformations comprises the plurality of second gamma groups of the plurality of first gamma groups.

9. The color compensation system of claim 8, wherein the plurality of second pulse number transformations respectively correspond to the same or different amounts of the plurality of second gamma groups.

10. The color compensation system of claim 7, wherein the plurality of frame rates are within an application frequency range.

11. The color compensation system of claim 10, wherein the target frame rate is within a range of the plurality of frame rates.

12. The color compensation system of claim 7, wherein the calculation method is an interpolation algorithm.

* * * * *